Aug. 25, 1964 P. LAMBERT 3,146,041

STORAGE ENCLOSURE FOR PHONOGRAPH RECORDS

Filed Oct. 26, 1961

3 Sheets-Sheet 1

INVENTOR
PIERRE LAMBERT

BY Philip D. Junkins
ATTORNEY

STORAGE ENCLOSURE FOR PHONOGRAPH RECORDS

Filed Oct. 26, 1961 3 Sheets-Sheet 3

3,146,041

STORAGE ENCLOSURE FOR PHONOGRAPH RECORDS

Pierre Lambert, 175 Orchard Ridge Road, Chappaqua, N.Y.

Filed Oct. 26, 1961, Ser. No. 147,991
2 Claims. (Cl. 312—10)

The present invention relates to the storage of phonograph records and relates more particularly to record storage enclosures which provide lint-free record storage and ease of record retrievability.

In the past it has been the usual practice to provide record albums in which records forming the component parts of a work such as a symphony or concerto were sold and thereafter stored by the user. The use of these albums as diminished considerably since the introduction of the long-playing record wherein the entire work or selected group of compositions may be recorded on a single disc rather than on five or six separate discs. In view of the relatively higher price of the single long-playing record, a single protective envelope is provided for each one, which envelopes are generally stacked on a shelf or placed vertically thereon or are stored in a container or cabinet. Whether the records in their individual envelopes are stacked or stored in usual filing cabinets, it is frequently necessary to inspect most, if not all, of the records of the stack or in the file to ascertain the location of the desired record.

Further, with the emphasis now on high-fidelity and stereo-phonic recording, the care given phonograph records has become of considerable importance. Stacking or filing of such records without their protecting envelope leads to harmful distortion of, dirt accumulation in, and scratching of, the recording surfaces.

It is the object of the present invention to provide a record storage system, wherein individual records are selectable and returnable at will to a prearranged file with a minimum of effort.

A further object of the invention is to provide a record storage system in which individual records may be withdrawn directly without subsequent removal of a protective envelope and without disturbing other records therein.

A still further object of the invention is to provide a record storage system in which there is provided a space for every record, and in which records may be withdrawn from, and returned to, each of such spaces with a minimum of effort, and in which the playing surfaces of each record are cleaned during their removal from, and return to, such spaces.

A still further object of the invention is to provide a record storage system in which individual records may be withdrawn directly without subsequent removal of a protective envelope and without disturbing other records therein, and in which the identity of each stored record is plainly visible.

The above and other features of the invention will appear more fully hereinafter from the following description when taken in conjunction with the accompanying drawings. It is to be expressly understood that the drawings are employed for purposes of illustration only and not intended as a definition of the limits of the invention, reference being had for this purpose to the appended claims.

Figure 10A:
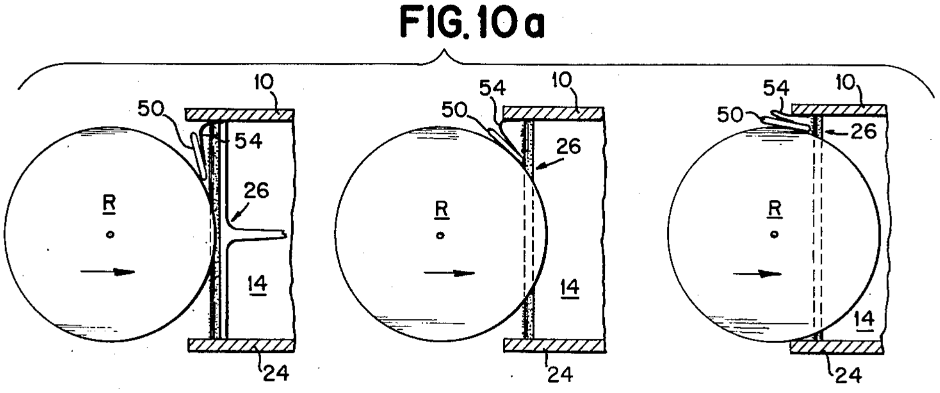
Figure 10B:
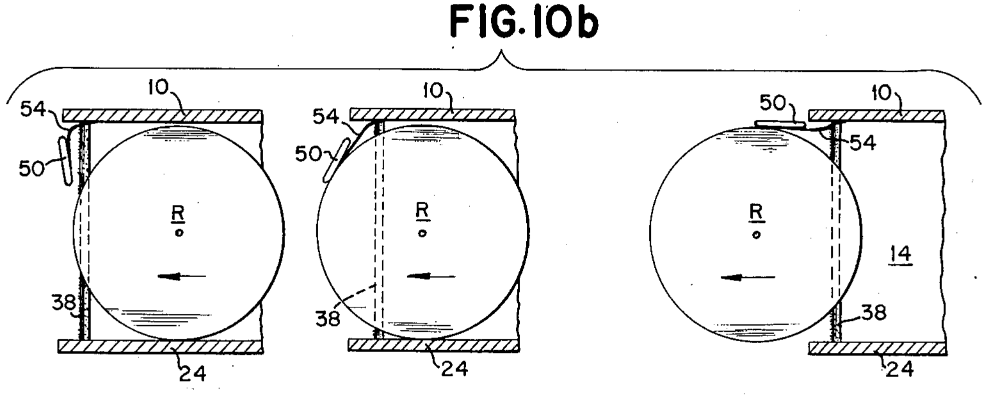

FIGURE 10*a* is a partial sectional end view of a record cabinet according to the present invention showing the manner of deflection of the indicia support and index card sheath during insertion of a record into the cabinet; and FIGURE 10*b* is a partial sectional end view of a record cabinet according to the present invention showing the manner of deflection of the indicia support and index card sheath during withdrawal of a record from the cabinet.

Referring to the drawings, and particularly FIGURES 1 through 4, there will be seen a cabinet having a top 10, end walls 12 and 14 and a rear wall 16. The cabinet may be formed upon a base 18 and pairs of legs 20 and 22 providing a bottom shelf 24 upon which phonographic records may be placed for storage.

Figure 1:
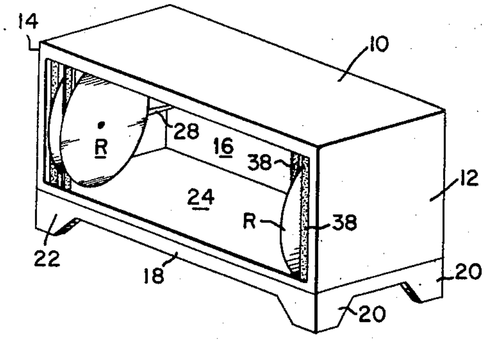
FIGURE 1 is a perspective view of a record cabinet embodying the present invention.
Figure 2:
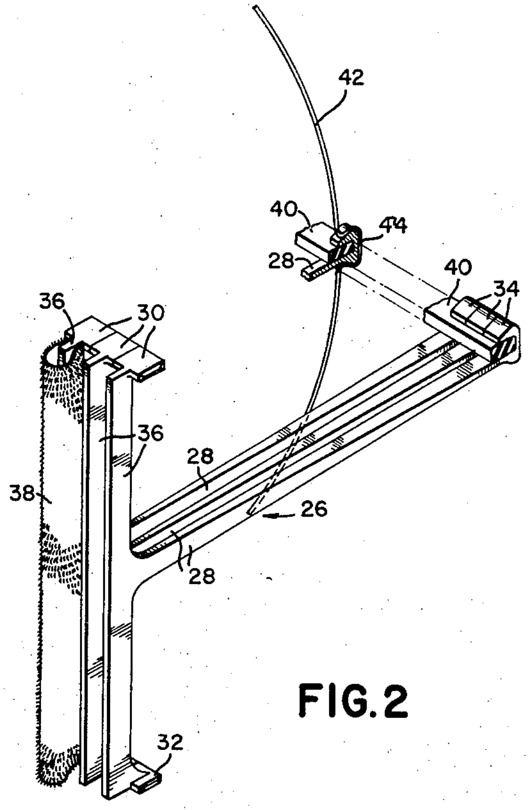
FIGURE 2 is a perspective view of one form of record spacing assembly used in connection with the record cabinet in FIGURE 1.

The top 10 and shelf 24 may be constructed of wood or other like material. Positioned within the cabinet type enclosure is a record spacing assembly 26 comprised (as shown in FIGURE 2) of a plurality of T-shaped partition members 28. The record spacing T members 28 may be maintained in spaced alignment by spacing portions 30, 32 and 34. Each of the partition members 28 may be formed of plastic, sheet metal or the like with portions 30, 32, and 34 provided with interlocking faces whereby appropriate alignment may be mechanically maintained and/or upon which adhesive can be applied during assembly of like partitions 28.

Along the front edge 36 of each T member 28 and affixed thereto at the surfaces of both sides of the front edge, there is provided a loop 38 of material comprised of either natural or artificial fibers which is capable of both cleaning a record during the withdrawal from, or the return to, storage; and of substantially closing the access opening between adjacent T members 28 when a record is seated in storage position between T members 28. Such material may take the form of a velvet strip or other textile material and preferably be of such character that, when affixed in its loop fashion along edge 36 (see FIGURE 4), it maintains its configuration as a resilient loop.

Figure 5:
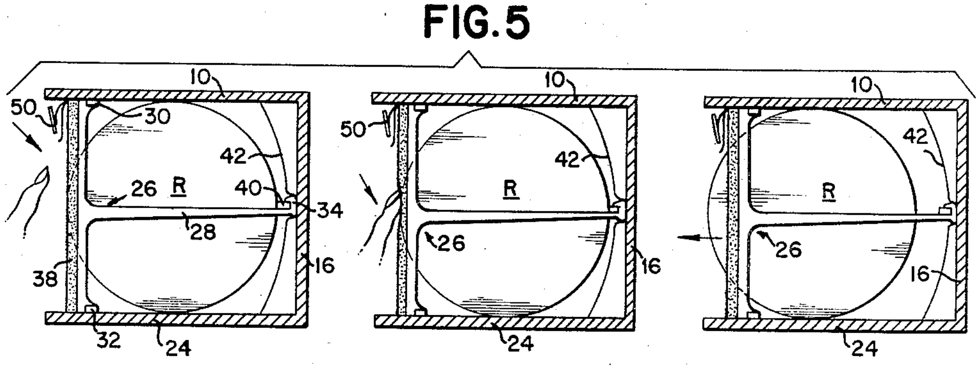
FIGURE 5 is a sectional end view of the record cabinet of FIGURE 1 showing the manner of retrieval of records stored therein.

FIGURE 5 illustrates a preferred means of retrieving a record from its stored position in accordance with the invention. In FIGURE 5 record R is shown in its stored position with a retriever member 40 supported by portion 34 of the partition member 28 adjacent the rear cabinet wall 16. The retriever member 40 may be formed of any resilient material and is affixed in the groove formed by portions 34 of the T members 28 by an adhesive or other means. After selection of the record desired, adjacent closure loops 38 are depressed at a point intermediate their upper and lower ends thereby simultaneously pushing the selected record toward the rear of the cabinet and into resilient retriever member 40.

When pressure on the loops and record is relieved, the depressed portion of member 40 quickly returns to its normal position and thereby causes the record to roll forward to a point whereat it protrudes from the cabinet, between adjacent vertical loops 38, so that the party selecting the record may grasp the edge thereof and remove the record from the cabinet and in so doing cleans the record's playing surfaces.

It has been found that only a slight pressure on the front edge of the loops 38 toward the rear of the cabinet is needed to cause the record to roll forward (upon pressure release) to a point whereat the record may be easily removed.

Figure 3:
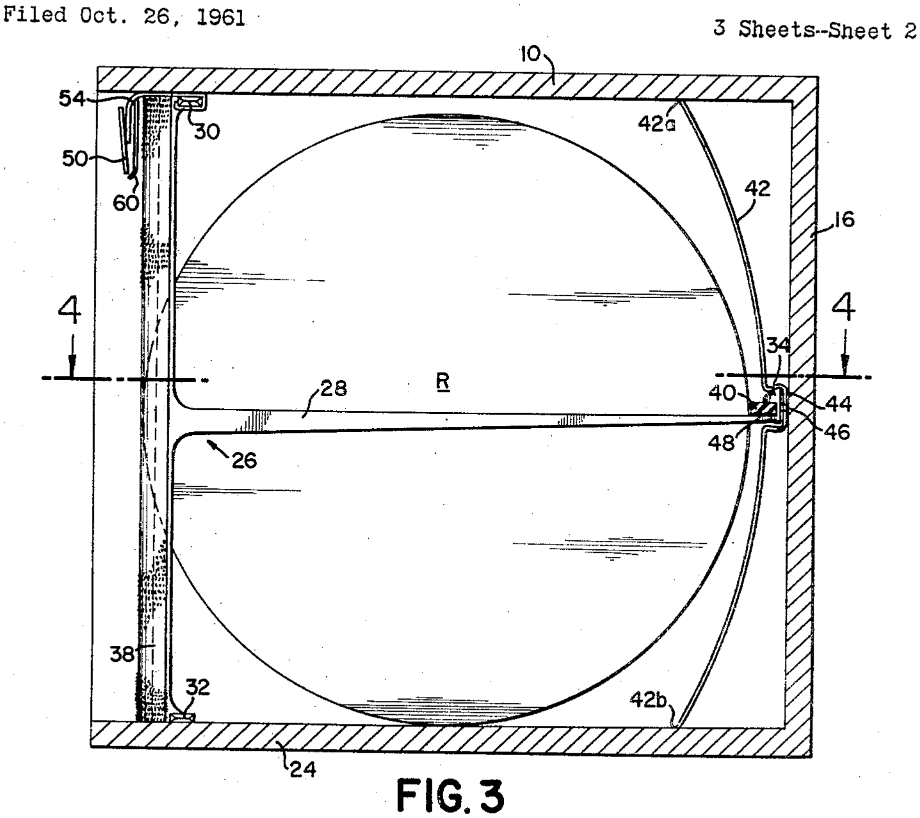
FIGURE 3 is a sectional end view of the record cabinet of FIGURE 1 showing a method of retaining the record spacing assembly of FIGURE 2 within the cabinet.
Figure 4:
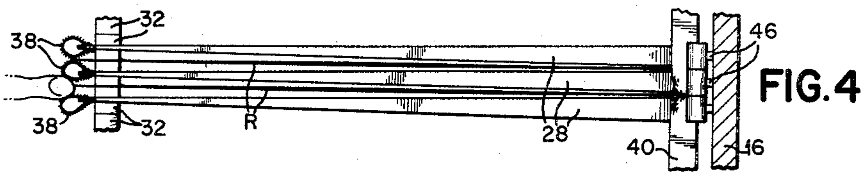
FIGURE 4 is a partial top sectional view of the record cabinet of FIGURE 1 showing cleaning strips according to the present invention.

The entire record spacing assembly 26 may be easily slipped into its containing cabinet and retained therein by any appropriate means. As illustrated in FIGURES 2 and 3 the assembly 26 may be retained by one or more resilient metallic spacers 42 which not only grips the base and top portions of the cabinet at 42*a* and 42*b*, but, positions the leg of T members 28 so that it is in substantially horizontal alignment within the cabinet with portion 34 held adjacent the rear wall 16 of the cabinet. Spacers 42 are provided with an intermediate gripping portion 44 which takes the form of portion 34 of T member 28 and maintains the same in its aforementioned position within the enclosing cabinet. Portion 34 of the T members may be formed with projection 46 to assure alignment of the entire assembly within the cabinet with the gripping portion 44 of the one or more spacers 42 resting between subject projections. The resilient retriever member 40 may be provided (as shown in FIGURE 3) with a substantially rigid backing strip 48 made of metal or other material which aids in maintaining rigidity of the entire assembly 26 of T members 28.

Figure 6:
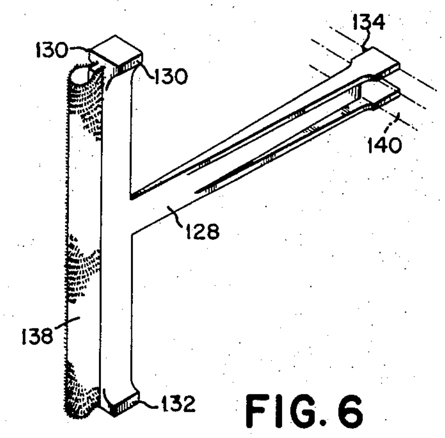
FIGURE 6 is a perspective view of a modified form of record spacing element according to the invention.

In FIGURE 6 there is shown an alternate form T-shaped partition member 128. As illustrated in FIGURE 6, the T-shaped member is a single molded element similar to the molded members 28 of FIGURES 2, 3 and 4 and formed of appropriate material, such as a molding plastic, with spacing projections 130, 132 and 134 formed integrally with the body of the T member. A plurality of these elements may be arranged in the manner shown in FIGURE 2 and provide proper record spacing with the protective and retrievable aspects of record storage as described above. The retriever member 140 is positioned between projections 134 and can be affixed to the rear wall of the cabinet to receive and position the T members 128.

Figure 7:
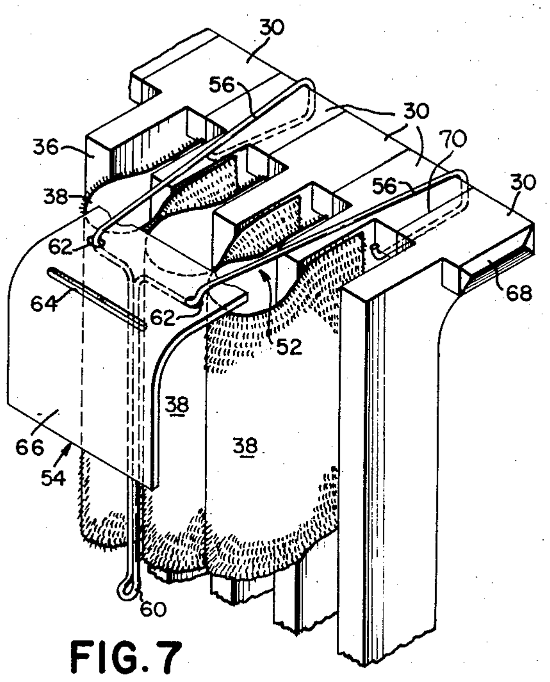
FIGURE 7 is a partial perspective view of one form of record indicia support means associated with the record spacing assembly of FIGURE 2.
Figure 8:
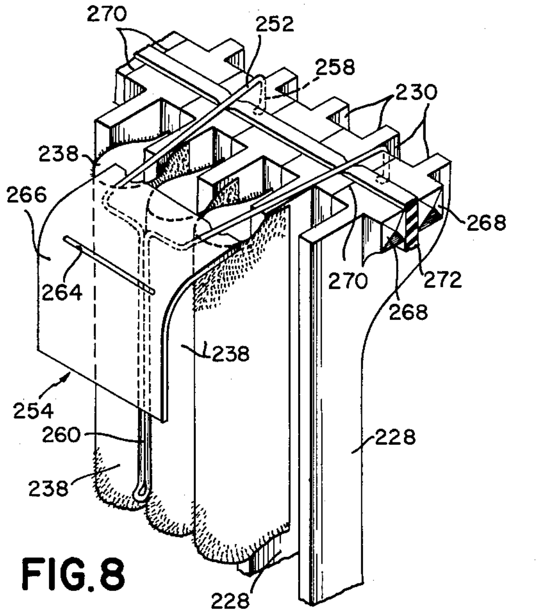
FIGURE 8 is a partial perspective view of a modified form of a record indicia support means associated with record spacing elements of modified form.
Figure 9:
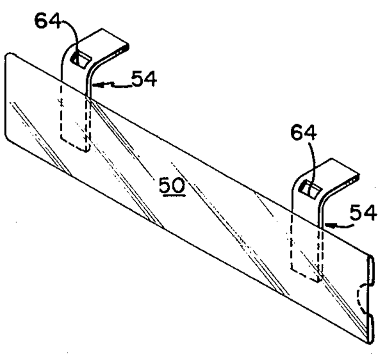
FIGURE 9 is a perspective view of a preferred index card sheath to be associated with the indicia support means of FIGURE 7 or FIGURE 8.

In order to select records which have been stored in a cabinet designed in accordance with this invention, a number or letter coding system may be applied at the front edge of the top 10 or the shelf 24. Alternatively, a number or letter coding system may be associated with the vertical strips or loops 38. As shown in FIGURE 7, there may be provided a clip-on type support assembly for record indicia of a type positioned adjacent the front edge of the top of record cabinets of the general type illustrated in FIGURE 1. Together with an alternative type of clip-on support as shown in FIGURE 8, two or more of such clip-on units may support an index card sheath such as shown in FIGURE 9. The index card sheath 50 may be made of any well known construction from transparent material. The names or numbers of record selections stored within the cabinet may be typed in proper sequence on an index card of proper configuration (not shown) and the same slipped into the sheath.

The clip-on type index support of FIGURE 7 may comprise of clip 52 formed of relatively stiff wire and a flexible index sheath holder 54 formed of rubber or other suitable material. The wire clip 52 is formed with two horizontal clip legs 56 which project over portions 30 of elements 28 and lock thereto by hook portions 58 formed in the ends of the clip 52. The intermediate portion of the wire may be formed into a single depending leg portion 60 which (in operative position) aligns with the front edge of loop 38 of one of the T members 28 thereby permitting uninhibited record access to adjacent record storage ports defined by loops 38. As illustrated, the clip 52 supports flexible holder 54 with the leg portions 56 passing through perforations 62 in holder 54. A slot 64 may be formed in holder 54 to yield a hinge-like effect to the index support structure. The depending portion 66 of the flexible holder 54 may be affixed to the index sheath 50 by adhesive or other appropriate means.

The depending portions 66 of flexible holder 54 and the index sheath 50 will not (because of their illustrated structure and relationship) inhibit the insertion of records into the cabinet or the withdrawal of records from the cabinet. FIGURE 10*a* illustrates the sequential deflection path of index sheath 50 during the insertion of record into the cabinet and FIGURE 10*b* illustrates the sequential deflection path of the index sheath 50 during the withdrawal of a record from the cabinet.

As heretofore mentioned, FIGURE 8 illustrates an alternative arrangement of supporting means for the index sheath. Index clip 252 includes leg portions 256 which terminate in modified hook portions 258. These shortened hook portions terminate within depressions in portions 230 of spacer elements 228. The top spacing portions 230, as well as bottom spacing portions (not shown), of elements 228 are provided with dual male and female positioning lugs 268 and 270, respectively, similar to positioning lugs 68 and 70 of elements 30 (see FIGURE 7). Adjacent male and female lugs 68 and 70 or 268 and 270 interlock providing the necessary structural stability to the assembly 26 and 226, respectively. As previously mentioned, adjacent surfaces of such lugs may be coated with an adhesive for greater strength. As shown in FIGURE 8, the particular form of the elements 228 illustrated provides for the use of a strip 272 of rubber or other material which provides added cushioning of the entire assembly 226 within the cabinet.

It will be seen from a consideration of the disclosure thus described that there is provided an arrangement for storing and preserving the quality of a large number of disc records of the type described. The records are so stored that any particular record may be quickly selected and during its removal from and return to, the storage cabinet, the record is cleaned by non-destructive cleaning fibers located on vertical closure strips adjacent the front of the record case, cabinet or other form of storage enclosure.

Thus, it will be seen that records may be readily withdrawn and returned to a storage cabinet or enclosure without tedious removal of envelopes and with the assurance that they will be cleaned upon removal and maintained clean during periods of non-use.

Although several modified forms of the invention have been illustrated and described, it is to be understood that the invention is not limited thereto. As various changes in the construction and arrangement of parts may be made without departing from the spirit of the invention, as will be apparent to those skilled in the art, reference will be had to the appended claims for a definition of the limits of the invention.

What I claim is:

1. A disc record storage unit comprising in combination a rectangular cabinet having one vertical side open, a plurality of partitions vertically disposed within the cabinet, said partitions being parallel and equally spaced from each other to form individual record receiving pockets, each partition having a vertical edge portion adjacent the open side of the cabinet and generally coextensive therewith, a resilient loop of material secured to the vertical edge portion of each partition so that the loop will extend outwardly from said vertical edge portion, each loop being of sufficient size to partially span the space between adjacent partitions and tangentially engage the adjacent loop to form a dust seal, record indicia means positioned immediately adjacent the upper portion of the outward edge of the partitions, and resilient means secured to the cabinet for resiliently supporting said record indicia means so that the indicia means will move to a non-interfering position during removal and insertion of the records.

2. The invention as described in claim 1 and wherein the record indicia means comprises a transparent sheath to receive indicia.

References Cited in the file of this patent

UNITED STATES PATENTS

| | | |
|---|---|---|
| 1,018,861 | Wood | Feb. 27, 1912 |
| 1,056,835 | Robbins | Mar. 25, 1913 |
| 1,076,993 | Pooler | Oct. 28, 1913 |
| 1,310,814 | Ward | July 22, 1919 |
| 1,429,076 | Helsley | Sept. 12, 1922 |
| 1,432,559 | Jamieson | Oct. 17, 1922 |
| 2,354,872 | Mitnick | Aug. 1, 1944 |

FOREIGN PATENTS

| | | |
|---|---|---|
| 341,702 | Great Britain | of 1931 |